US006321464B1

(12) United States Patent
Oberg et al.

(10) Patent No.: US 6,321,464 B1
(45) Date of Patent: Nov. 27, 2001

(54) SHOE WITH INSOLE AS PART SOLE FILLER AND METHOD OF MAKING SAME

(75) Inventors: Sven E. Oberg, Waynesville, NC (US); David P. Mitchell, Franklin, TN (US)

(73) Assignee: Georgia Boot LLC, Franklin, TN (US)

( * ) Notice: Subject to any disclaimer, the term of this patent is extended or adjusted under 35 U.S.C. 154(b) by 0 days.

(21) Appl. No.: 08/463,843

(22) Filed: Jun. 5, 1995

Related U.S. Application Data

(63) Continuation of application No. 08/101,964, filed on Jun. 7, 1993, now abandoned, which is a continuation of application No. 07/650,783, filed on Feb. 5, 1991, now abandoned.

(51) Int. Cl.[7] ............... A43B 13/28; A43B 13/38; A43B 13/00; A43D 11/00
(52) U.S. Cl. ............... 36/12; 36/31; 36/25 R; 36/44; 12/142 S; 12/142 T
(58) Field of Search ............... 36/30 A, 30 R, 36/31, 25 R, 43, 44, 28, 29, 12; 264/223, 224; 12/142 S, 142 T, 145

(56) References Cited

U.S. PATENT DOCUMENTS

| 3,007,184 | * | 11/1961 | Makovski | 12/145 |
| 3,672,078 | * | 6/1972 | Fukuoka | 36/11.5 |
| 3,913,160 | * | 10/1975 | Funck | 12/142 R |
| 4,034,431 | * | 7/1977 | Fukuoka | 36/11 X |
| 4,120,477 | * | 10/1978 | Justamante | 264/244 X |
| 4,150,455 | * | 4/1979 | Fukuoka | 36/11.5 X |
| 4,635,384 | * | 1/1987 | Huh et al. | 36/28 X |
| 5,042,174 | * | 8/1991 | Nichols | 36/31 X |

FOREIGN PATENT DOCUMENTS

| 1015347 | * | 2/1957 | (DE) | 36/28 |
| 2318521 | * | 10/1974 | (DE) | 36/28 |
| 1145809 | * | 3/1969 | (DE) | 36/32 R |
| 1068538 | * | 6/1954 | (FR) | 36/28 |
| 2034828 | * | 12/1970 | (FR) | 36/30 R |
| 490227 | * | 2/1954 | (IT) | 264/244 |
| 1171916 | * | 7/1989 | (JP) | 36/25 R |

* cited by examiner

*Primary Examiner*—Paul T. Sewell
*Assistant Examiner*—Anthony Stashick
(74) *Attorney, Agent, or Firm*—Milton Wolson

(57) ABSTRACT

A method of manufacture of footwear and the footwear comprising the steps of providing a last with an upper thereon, providing a mold insert on the bottom of the last, providing a mold having a mold cavity for a tread sole, disposing the last and upper against the mold with the mold insert disposed within the mold cavity, forming a sole in the mold cavity having a depression therein in the shape of the mold insert, providing an insole with a first portion in the shape of the depression and a second portion substantially in the shape of the sole and securing the first portion of the insole in the depression. The tread sole and insole are formed of materials preferably having different physical properties. The tread sole can include one of tongues and grooves and the insole would then have the other of tongues and grooves, said tongues and grooves mating with each other. The step of providing an insole can include removing the mold insert from the mold cavity, disposing the last spaced from the tread sole and then forming the insole in the cavity formed by the removal of the weight relief and the spacing of the last from the tread sole.

30 Claims, 6 Drawing Sheets

SHOE WITH INSOLE AS PART SOLE FILLER AND METHOD OF MAKING SAME

This application is a Continuation, of application Ser. No. 08/101,964, filed Jun. 7, 1993 abandoned which is a continuation of Ser. No. 07/650,783, filed Feb. 5, 1991, now abandoned.

BACKGROUND OF THE INVENTION

1. Field of the Invention

This invention relates to a shoe having a sole filler provided in part by an insole and a method of making the shoe.

2. Brief Description of the Prior Art

In the manufacture of footwear, it is known to mold soles of rubber, polyvinyl chloride (PVC), polyurethane or other elastomers either directly to the shoe upper or to a welt which has been stitched to the shoe upper. Typical examples of such prior art are set forth in the patents of Auberry et al. U.S. Pat. No. 3,965,517 and 3,758,903. While footwear of the type set forth in the above mentioned prior art operates in satisfactory manner for the purposes intended, when a rigid sole is required, the sole tends to be heavy, relatively hard and does not provide good thermal insulation. On the other hand, when rigidity is not required and properties other than those inherent in rigid soles are desired, foamed soles have been utilized. British Patent No. 1,444,091 discloses a shoe having a sole with cavities at the heel and ball regions with insertion of a resilient cushioning material therein at the ball region only. This patent requires multiple inserts which are separately insertable and discontinuous, thereby requiring added labor cost and failing to provide maximum thermal insulation. However, the prior art has not provided the combination of sole rigidity with sole softness or cushioning, light weight and good thermal insulation properties all in a single shoe.

SUMMARY OF THE INVENTION

In accordance with the present invention, there is provided a sole and method of making same which can provide the rigidity of the prior art rigid soles and still provide the other above noted desirable properties not inherent in rigid soles.

Briefly, in accordance with the present invention, there is provided a shoe having an upper and a sole secured to the upper, either directly or through a welt the sole, is preferably rigid, and can have any desired properties, includes a hollow sole interior section extending from the toe region to and under the ball and entire heel region into which is secured a preferably premolded insole of a material having the desired properties, preferably a relatively soft foam which provides cushioning, light weight and thermal insulation. The insole includes a cradled lip extending over the remaining interior portion of the sole which provides added comfort and thermal insulation. The insole can be cradled as opposed to being flat to better conform to the contour of the wearer's foot. The insole is secured to the sole by means of adhesive, such as an epoxy, or by mating members in the sole and insole, such as a tongue and groove, the tongue preferably being a portion of the insole and the groove being premolded into the sole. The tongue and groove insole embodiment can be made easily removable for the purpose of, for example, drying, airing or cleaning thereof.

The shoe with sole in accordance with the present invention is fabricated by placing an upper on a last in standard manner, placing a mold insert in the shape of the hollow sole interior section on the last bottom, the mold insert preferably being a permanent part of the last bottom, bringing the sole plate or mold for the sole and the last with upper thereon together in standard manner and then forming the sole in the sole plate. The sole will adhere to the welt or the upper as in the prior art. However, there will be a cavity in the sole in the shape of mold insert, this cavity being the hollow sole interior section. The sole will also contain grooves in the event the insole is to be mated therewith.

An insole is preferably premolded and is preferably of a material different from that of the sole. This insole has a bottom portion which is the same shape as the hollow sole interior section and fits therein, the remaining portion of the insole, or lip, lying above the sole and resting thereover. After removal of the upper from the last with mold insert, the insole is secured to the sole either by an adhesive, preferably an epoxy, or by tongues formed in the bottom portion thereof which mate with the grooves in the sole, thereby providing a removable insole. Of course, the tongues and grooves can be reversed.

As an alternative, the mold insert can be removed from the last after formation of the sole and a second material can be inserted into the hollow sole interior section. In this case, the last without the mold insert and the sole form the mold cavity for the second material.

The sole is formed from any of the known prior art moldable sole materials, all of which are well known. Preferable sole materials are thermoplastic materials, preferably PVC, and rubber. Preferable insole materials are foams, preferably polyurethane and other blown materials.

BRIEF DESCRIPTION OF THE DRAWINGS

FIG. 4c is a rear view of the molded insole of FIG. 4a; and

DESCRIPTION OF THE PREFERRED EMBODIMENTS

Figure 1A:
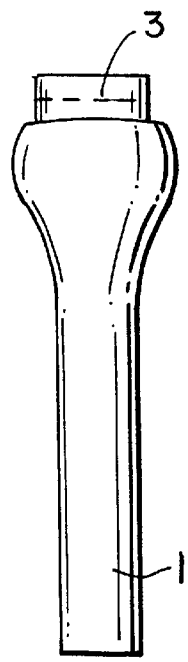
FIG. 1A is a rear view of the molding last shown in FIG. 1.
Figure 1:
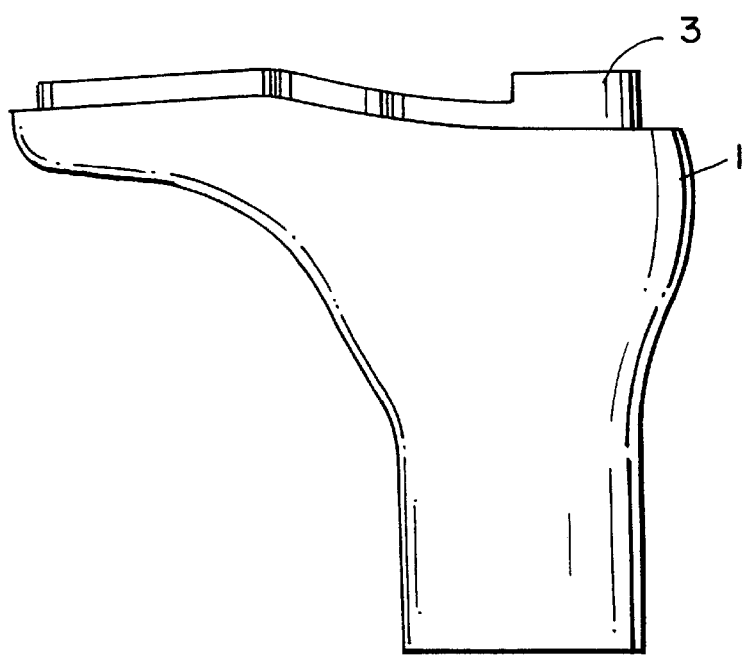
FIG. 1 is a side view of a molding last with mold insert in accordance with the present invention.
Figure 1B:
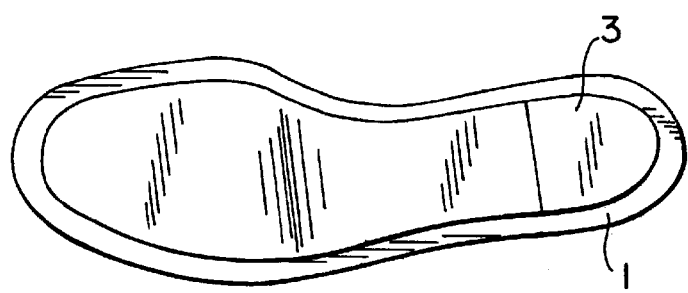
FIG. 1B is a bottom view of the molding last shown in FIG. 1.
Figure 2:
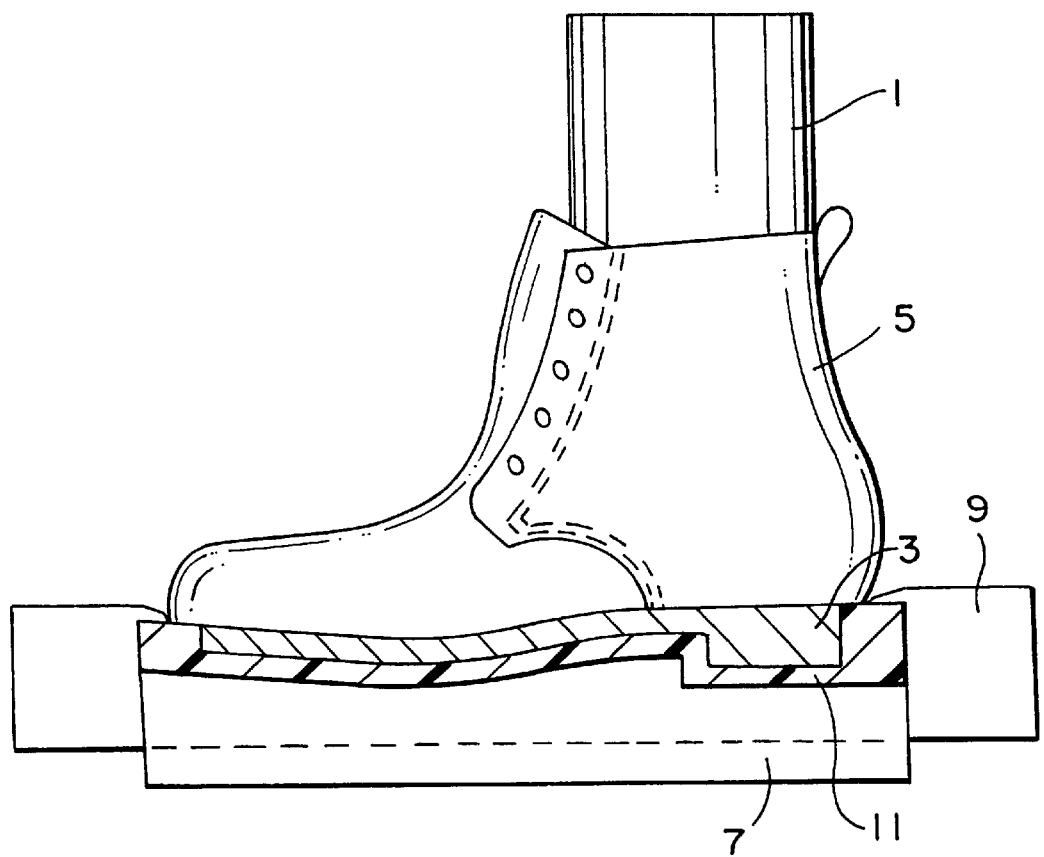
FIG. 2 is a side view, partially in elevation and partially in section, of a molding last with upper in position for having a sole directly molded to the upper in accordance with the present invention.

Referring first to FIG. 1, there is shown a standard molding last 1 having a mold insert 3 secured thereto. The mold insert 3 is shaped to provide the hollow tread sole interior section to be discussed hereinbelow. A shoe upper 5, with or without a welt secured thereto, is disposed over the molding last 1 with mold insert 3, as shown in FIG. 2, and the last is mechanically held in place against the sole frame 9, within which the sole plate 7 is moved upwardly to its proper position with the upper 5 or welt (not shown) in contact with the upper edge of the sole frame. The material from which the tread sole 11 is formed is then entered into the hollow cavity of the sole plate between the sole plate and the mold insert 3 to form the tread sole 11. Everything discussed to this point is done in standard manner with the exception of the use of the mold insert 3.

Figure 3:
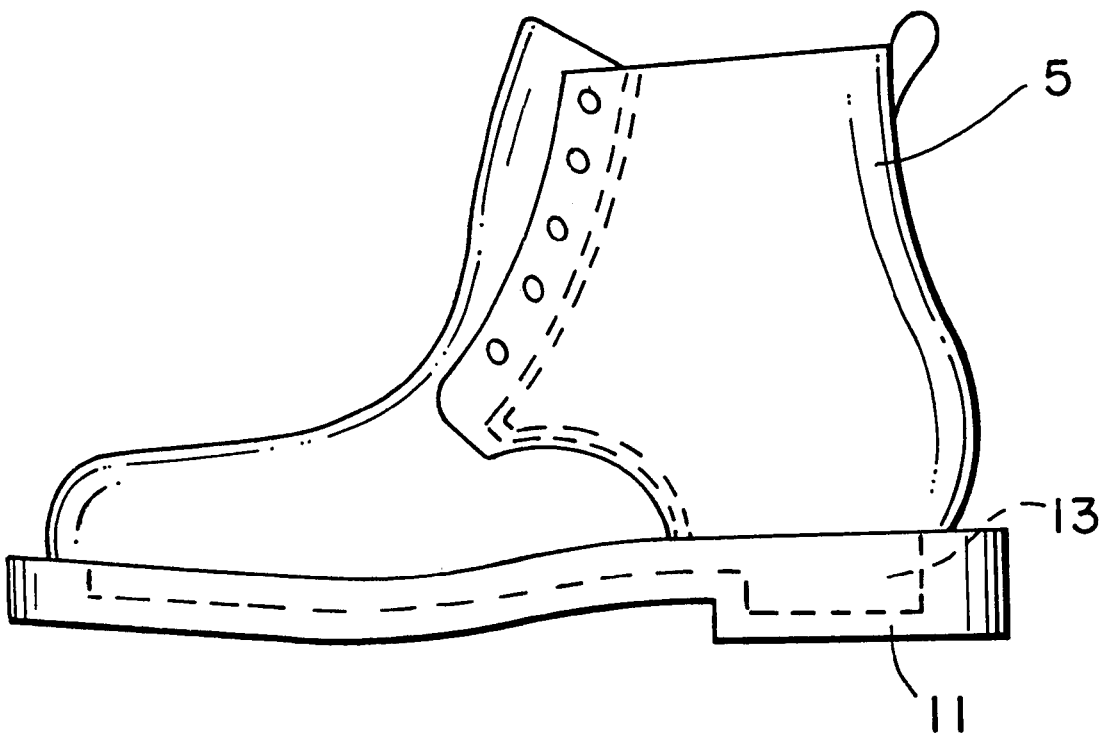
FIG. 3 is a side elevational view of a shoe after removal from the molding last with a cavity in the tread or outer sole within the shoe.
Figure 6:
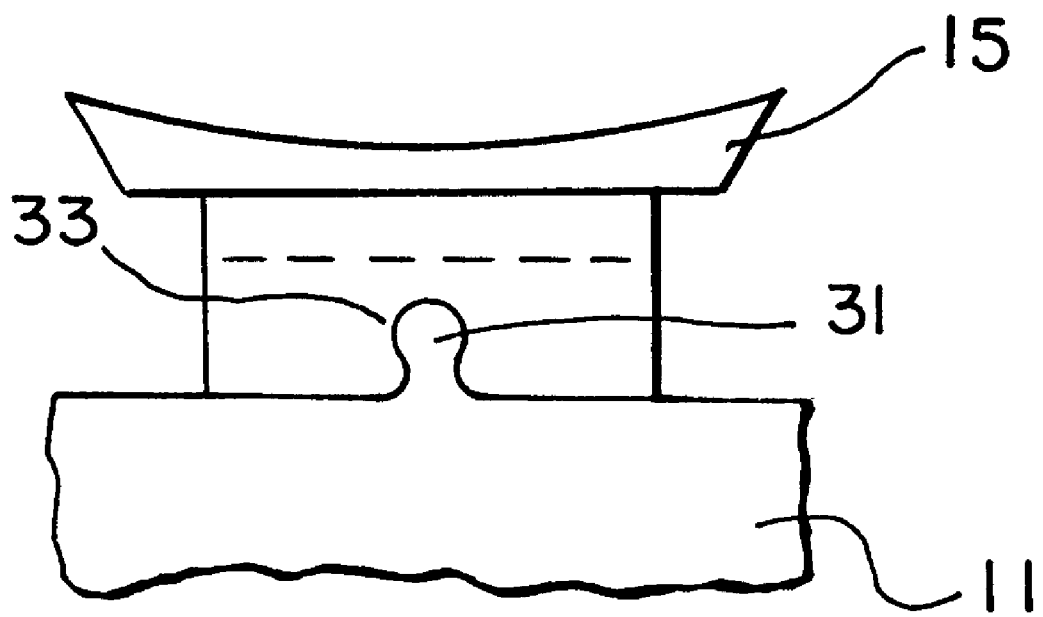
FIG. 6 is a rear view of the molded insole and a partial rear view of the tread sole in a embodiment of the present invention.

The upper 5 is then removed from the molding last 1 and mold insert 3. At his time, the tread sole 11 is secured to the upper 5, either directly or via a welt, and the cavity 13 wherein the mold insert 3 was disposed during molding of the tread sole is now hollow, this cavity being the hollow sole interior section and shown in FIG. 3. Grooves and/or tongues are optionally disposed in the tread sole 11 if the mold insert 3 contains finger or groove portions to accommodate formation thereof during the tread sole molding step as shown in FIG. 6.

Figure 4A:
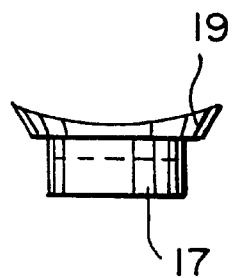
FIG. 4A is a rear view of the molded insole shown in FIG. 4.
Figure 4:
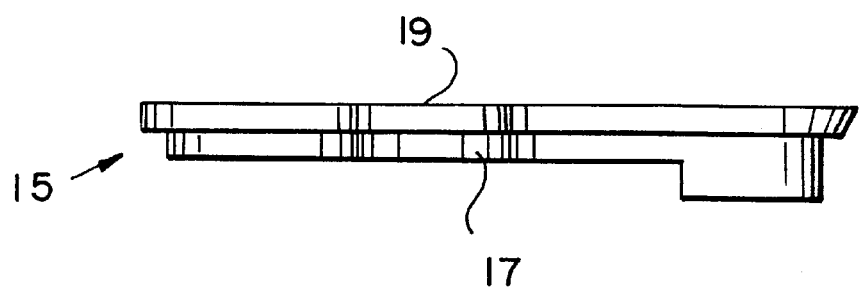
FIG. 4 is a view of a molded insole for use in accordance with e present invention.
Figure 4B:
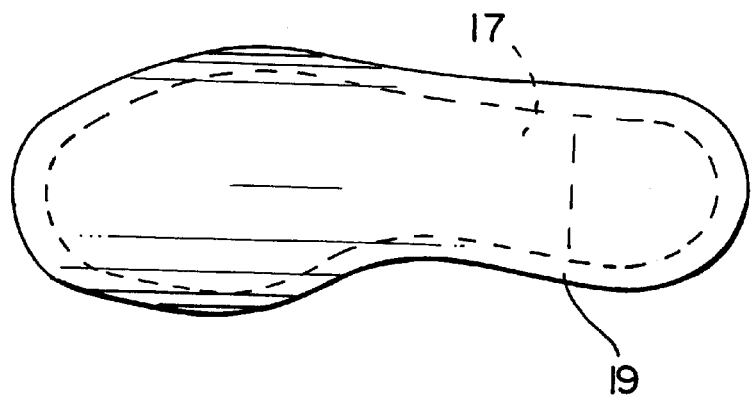
FIG. 4B is a bottom view of the molded insole shown in FIG. 4.

An insole 15 is then disposed in the hollow sole interior section as shown in FIG. 4. In accordance with one embodiment of the invention, as shown in FIGS. 4a to 4c, the insole 15 is separately molded and includes a lower portion 17 which has substantially the same shape as the cavity 13 and an upper portion or lip 19 which preferably rests over the entire upper surface of the tread sole 11 external of the carty. The insole 15 is secured to the tread sole 11 by an adhesive, preferably an epoxy, and/or by mating of tongue and groove members, if present, or just inserted.

In accordance with another embodiment of the invention, after removal of the upper from the molding last 1 and mold insert 3, the mold insert is removed from the molding last and the molding last is replaced in the upper at its original position therein except for some displacement from the tread sole 11 to permit a section similar to the upper portion 19 to be formed. It is apparent that the space previously occupied by the mold insert 3 is now a new cavity as well as the space between the tread sole 11 and the molding last 1. Accordingly, in a second molding operation, a second material, preferably a foam such as polyurethane, is inserted in the newly formed cavity, the foam adhering to the tread sole 11 within the cavity 13 and also being disposed over the entire sole tread.

Figure 5:
FIG. 5 is a side elevational view of a shoe in accordance with the present invention with insole/sole filler disposed in and over the tread sole.

The end result of either of the above described procedures is a shoe having an upper 5, a tread sole 11 and a separate insole 15 secured to the tread sole and extending thereover as shown in FIG. 5. The insole 15 can be permanently affixed to the tread sole 11, such as with an epoxy, or can be removable therefrom, such as with the use of the tongue and groove members, as discussed hereinabove or just inserted. An example of a tongue and groove arrangement is shown in FIGS. 6a and 6b wherein the heel portion 21' of the insole 15' in FIG. 6a contains a groove 23 extending therethrough and the tread sole 11' includes a tongue 25 having an outer contour the same as the inner contour of the groove 23, this being one example of many well known tongue and groove arrangements.

FIG. 6 shows a tongue and groove configuration wherein the tongue 31 is shown extending from the tread sole 11 and the groove 33 is shown formed in the insole 15.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A method of manufacture of footwear comprising the steps of:

(a) providing a last with an upper thereon said last having a toe region at one end thereof and a heel region at an opposing end thereof, said upper, when secured to a tread sole, fully enclosing the wearer's foot to provide thermal insulation;

(b) providing a mold insert on the bottom of said last extending continuously from said toe region and beneath the ball of a wearer's foot to and beneath said heel region, and wherein said mold insert in the heel region is formed of a solid material and is of substantially greater thickness than other portions of said mold insert;

(c) providing a mold having a mold cavity for an outer sole;

(d) disposing said last and upper against said mold with said mold insert disposed within said mold cavity;

(e) forming said tread sole having a top surface in said mold cavity, said tread sole having a tread cavity therein in the shape of said mold insert;

(f) providing an insole of premolded material in said tread cavity with at least a portion thereof in the shape of said tread cavity extending continuously from said toe region to and disposed beneath the ball of a wearer's foot to and beneath said heel region including the central portion of said heel region to provide cushioning relative to said sole and to provide support under a wearer's foot depressed against said insole from said toe region to said central portion of said heel region; and (g) securing said insole to said sole in said tread cavity.

2. A method as set forth in claim 1 wherein steps (f) and (g) comprise the steps of removing said mold insert from said mold cavity, disposing said last spaced from said tread sole and then forming said insole in the cavity formed by said removal of said mold insert and the spacing of said last from said tread sole.

3. A method as set forth in claim 1 wherein said insole includes a lip portion integral therewith and extending external of said depression and over the upper surface of said tread sole and wherein steps (f) and (g) comprise the steps of removing said mold insert from said mold cavity, disposing said last spaced from said tread sole and then forming said insole in the cavity formed by said removal of said mold insert and the spacing of said last from said tread sole.

4. A method as set forth in claim 1 wherein said tread sole includes one of tongues and grooves and said insole has the other of tongues and grooves, said tongues and grooves mating with each other and wherein steps (f) and (g) comprise the steps of removing said mold insert from said mold cavity, disposing said last spaced from said tread sole and then forming said insole in the cavity formed by said removal of said mold insert and the spacing of said last from said tread sole.

5. A method as set forth in claim 3 wherein said tread sole includes one of tongues and grooves and said insole has the other of tongues and grooves, said tongues and grooves mating with each other and wherein steps (f) and (g) comprise the steps of removing said mold insert from said mold cavity, disposing said last spaced from said tread sole and then forming said insole in the cavity formed by said removal of said mold insert and the spacing of said last from said tread sole.

6. A method of manufacture of footwear comprising the steps of:
  (a) providing a last with an upper thereon having a toe region at one end thereof and a heel region at an opposing end thereof, said upper, when secured to a tread sole, fully enclosing the wearer's foot to provide thermal insulation;
  (b) providing a mold insert on the bottom of said last extending continuously from said toe region to and beneath the ball of a wearer's foot to and beneath said heel region, and wherein said mold insert in the heel region is formed of a solid material and is of substantially greater thickness than other portions of said mold insert;
  (c) providing a mold having a mold cavity for a tread sole;
  (d) disposing said last and upper against said mold with said mold insert disposed within said mold cavity:
  (e) forming said tread sole having a top surface in said mold cavity, said tread sole having a tread cavity conforming to said mold insert;
  (f) forming an insole of premolded material with a first portion in the shape of said mold insert extending continuously from said toe region and beneath the ball of a wearer's foot to and beneath said heel region including the central portion of said heel region to provide cushioning relative to said sole and to provide support under the ball of the wearer's foot and said central portion of said heel region when depressed thereagainst; and
  (g) securing said insole in said tread cavity.

7. A method of manufacturing a sole for footwear as set forth in claim 6, including the further step of forming a tread sole substantially in the shape of said mold cavity and having a cavity corresponding in shape to the mold insert.

8. A method as set forth in claim 5 wherein the mold insert is thicker at the rear portion thereof than at the front portion thereof.

9. A method as set forth in claim 7 wherein the mold insert is thicker at the rear portion thereof than at the front portion thereof.

10. A method according to claim 7 wherein said insole includes a lip portion integral therewith and extending external of said cavity and over said tread sole.

11. A method as set forth in claim 1 wherein said insole includes a contoured outer surface.

12. A method as set forth in claim 6 wherein said insole includes a contoured outer surface.

13. Footwear comprising:
  (a) a tread sole having a top surface and having a toe region at one end thereof and a heel region at an opposing end thereof and an upper secured to said tread sole which, in conjunction with said tread sole, fully encloses the wearer's foot to provide thermal insulation;
  (b) said tread sole including a cavity therein extending continuously from said toe region and beneath the ball of a wearer's foot to and beneath said heel region and beneath a wearer's heel, and wherein said cavity in the heel region is of substantially greater thickness than other portions of said cavity;
  (c) an insole with a first portion in the shape of said cavity extending continuously from said toe region and beneath the ball of a wearer's foot to and beneath said heel region and beneath a wearer's heel to provide support under a wearer's heel depressed against said heel region, said first portion of said insole disposed over said tread sole in said depression;
  (d) wherein said tread sole and said insole are formed of materials having different physical properties;
  (e) wherein said insole is adhesively secured to said tread sole; and
  (f) wherein the insole is thicker at the rear portion thereof than at the front portion thereof.

14. Footwear comprising:
  (a) a tread sole having a top surface and having a toe region at one end thereof and a heel region at an opposing end thereof and an upper secured to said tread sole which, in conjunction with said tread sole, fully encloses the wearer's foot to provide thermal insulation;
  (b) said tread sole including a cavity therein extending continuously from said toe region and beneath the ball of a wearer's foot to and beneath said heel region and beneath a wearer's heel, and wherein said cavity in the heel region is of substantially greater thickness than other portions of said cavity;
  (c) an insole with a first portion in the shape of said cavity extending continuously from said toe region and beneath the ball of a wearer's foot to and beneath said heel region and beneath a wearer's heel to provide support under a wearer's heel depressed against said heel region, said first portion of said insole disposed over said tread sole in said depression; and
  (d) wherein said insole includes a lip portion integral therewith and extending external of said cavity and over said tread sole.

15. Footwear comprising:
  (a) a tread sole having a top surface and having a toe region at one end thereof and a heel region at an opposing end thereof and an upper secured to said tread sole which, in conjunction with said tread sole, fully encloses the wearer's foot to provide thermal insulation;
  (b) said tread sole including a cavity therein extending continuously from said toe region and beneath the ball of a wearer's foot to and beneath said heel region and beneath a wearer's heel, and wherein said cavity in the heel region is of substantially greater thickness than other portions of said cavity;
  (c) an insole with a first portion in the shape of said cavity extending continuously from said toe region and beneath the ball of a wearer's foot to and beneath said heel region and beneath a wearer's heel to provide support under a wearer's heel depressed against said heel region, said first portion of said insole disposed over said tread sole in said depression; and
  (d) wherein said insole includes a contoured outer surface.

16. The method of claim 3 wherein said lip is disposed over the entire surface of said tread sole exterior to said cavity and within said upper.

17. The footware of claim 10 wherein said lip is disposed over the entire surface of said tread sole exterior to said cavity and within said upper.

18. The footware of claim 14 wherein said lip is disposed over the entire surface of said sole exterior to said cavity and within said upper.

19. A method of manufacture of footwear comprising the steps of:

(a) providing a last with an upper thereon said last having a toe region at one end thereof and a heel region at an opposing end thereof;

(b) providing a mold insert on the bottom of said last extending continuously from said toe region and beneath the ball of a wearer's foot to and beneath said heel region and wherein said mold insert in the heel region is formed of a solid material and is of substantially greater thickness than other portions of said mold insert;

(c) providing a mold having a mold cavity for an outer sole;

(d) disposing said last and upper against said mold with said mold insert disposed within said mold cavity;

(e) forming a sole in said mold cavity having a cavity therein in the shape of said mold insert;

(f) providing an insole of premolded material in said cavity with at least a portion thereof in the shape of said cavity extending continuously from said toe region of and beneath the ball of a wearer's foot to and beneath said heel region including the central portion of said heel region to provide cushioning relative to said sole and to provide support under a wearer's foot depressed against said insole from said toe region to said central portion of said heel region; and (g) securing said insole to said sole in said cavity.

20. A method of manufacture of footwear comprising the steps of:

(a) providing a last with an upper thereon having a toe region at one end thereof and a heel region at an opposing end thereof;

(b) providing a mold insert on the bottom of said last extending continuously from said toe region and beneath the ball of a wearer's foot to and beneath said heel region, and wherein said mold insert in the heel region is formed of a solid material and is of substantially greater thickness than other portions of said mold insert;

(c) providing a mold having a mold cavity for forming a tread sole;

(d) disposing said last and upper against said mold with said mold insert disposed within said mold cavity;

(e) molding said tread sole;

(f) forming an insole of premolded material with a first portion in the shape of said mold insert extending continuously from said toe region and beneath the ball of a wearer's foot to and beneath said heel region including the central portion of said heel region to provide cushioning relative to said sole and to provide support under the ball of the wearer's foot and said central portion of said heel region when depressed thereagainst; and (g) securing said first portion of said insole in said tread sole.

21. A method of manufacturing a sole for footwear as set forth in claim 20, including the further step of forming a tread sole substantially in the shape of said mold cavity and having a cavity corresponding in shape to the mold insert.

22. A method as set forth in claim 20 wherein the mold insert is thicker at the rear portion thereof than at the front portion.

23. Footwear comprising:

(a) a tread sole having a toe region at one end thereof and a heel region at an opposing end thereof and an upper secured to said tread sole;

(b) said tread sole including a cavity therein extending continuously from said toe region and beneath the ball of a wearer's foot to and beneath said heel region and beneath a wearer's heel and wherein said cavity in the heel region is of substantially greater thickness than other portions of said cavity;

(c) an insole with a first portion in the shape of said cavity extending continuously from said toe region and beneath the ball of a wearer's foot to and beneath said heel region and beneath a wearer's heel to provide support under a wearer's heel depressed against said heel region, said first portion of said insole disposed over said tread sole in said depression;

(d) wherein said tread sole and said insole are formed of materials having different physical properties;

(e) wherein said insole is adhesively secured to said tread sole; and (f) wherein the mold insert is thicker at the rear portion thereof than at the front portion thereof.

24. A method as set forth in claim 21 wherein the mold insert is thicker at the rear portion thereof than at the front portion thereof.

25. A method according to claim 20 wherein said insole includes a lip portion integral therewith and extending over said tread sole.

26. A method as set forth in claim 19 wherein said insole includes a contoured outer surface.

27. A method as set forth in claim 20 wherein said insole includes a contoured outer surface.

28. A method of manufacture of footwear comprising the steps of:

(a) providing a last with an upper thereon having a toe region at one end thereof and a heel region at an opposing end thereof;

(b) providing a mold insert on the bottom of said last extending continuously from said toe region and beneath the ball of a wearer's foot to and beneath said heel region, and wherein said mold insert in the heel region is formed of a solid material and is of substantially greater thickness than other portions of said mold insert;

(c) providing a mold having a mold cavity for a tread sole;

(d) disposing said last and upper against said mold with said mold insert disposed within said mold cavity;

(e) forming a tread sole;

(f) forming an insole of premolded material with a portion in the shape of said mold insert extending continuously from said toe region and beneath the ball of a wearer's foot to and beneath said heel region including the central portion of said heel region to provide cushioning relative to said sole and to provide support under the ball of the wearer's foot and said central portion of said heel region when depressed thereagainst; and (g) securing said portion of said insole in said tread sole.

29. Footwear comprising:

(a) a tread sole having a toe region at one end thereof and a heel region at an opposing end thereof and an upper secured to said tread sole;

(b) said tread sole including a cavity therein extending continuously from said toe region and beneath the ball of a wearer's foot to and beneath said heel region and beneath a wearer's heel, and wherein said cavity in the heel region is of substantially greater thickness than other portions of said cavity;

(c) an insole with a portion in the shape of said cavity extending continuously from said toe region and beneath the ball of a wearer's foot to and beneath said heel region and beneath a wearer's heel to provide support under a wearer's heel depressed against said heel region, said portion of said insole disposed over said tread sole in said cavity;

(d) wherein said tread sole and said insole are formed of materials having different physical properties;

(e) wherein said insole is adhesively secured to said tread sole; and (f) wherein the insole is thicker at the heel region than at the other portions of the insole.

30. Footwear comprising:

(a) a tread sole having a toe region at one end thereof and a heel region at an opposing end thereof and an upper secured to said tread sole;

(b) said tread sole including a cavity therein extending continuously from said toe region and beneath the ball of a wearer's foot to and beneath said heel region and beneath a wearer's heel, and wherein said cavity in the heel region is of substantially greater thickness than other portions of said cavity; and (c) an insole with a portion in the shape of said cavity extending continuously from said toe region and beneath the ball of a wearer's foot to and beneath said heel region and beneath a wearer's heel to provide support under a wearer's heel depressed against said heel region, said portion of said insole disposed over said tread sole in said cavity.

* * * * *

UNITED STATES PATENT AND TRADEMARK OFFICE
CERTIFICATE OF CORRECTION

PATENT NO. : 6,321,464 B1
DATED : November 27, 2001
INVENTOR(S) : Oberg et al.

Page 1 of 1

It is certified that error appears in the above-identified patent and that said Letters Patent is hereby corrected as shown below:

<u>Title page,</u>
Item [73], assignee, add the following: -- Ro-Search, Inc., Waynesville, N.C. (US) --

Signed and Sealed this

Twenty-eighth Day of May, 2002

Attest:

Attesting Officer

JAMES E. ROGAN
*Director of the United States Patent and Trademark Office*